United States Patent [19]
Hoover et al.

[11] Patent Number: 5,036,752
[45] Date of Patent: Aug. 6, 1991

[54] HYDRAULIC ACTUATOR HAVING FAIL-SAFE FEATURE WITH ENERGY ABSORBING SLEEVE

[75] Inventors: George E. Hoover, Dover; Douglas J. Leiby, Enola, both of Pa.

[73] Assignee: AMP Incorporated, Harrisburg, Pa.

[21] Appl. No.: 560,704

[22] Filed: Jul. 31, 1990

[51] Int. Cl.$^5$ .......................... F01B 3/00; F16J 15/18; B30B 1/23
[52] U.S. Cl. .................... 92/113; 92/130 R; 92/DIG. 4; 92/165 R; 100/269 R
[58] Field of Search ............... 92/165 R, 113, 171.1, 92/130 R, DIG. 4; 60/403; 72/453.01, 453.15, 465

[56] References Cited
U.S. PATENT DOCUMENTS

| | | | |
|---|---|---|---|
| 3,902,404 | 9/1975 | Breit | 92/165 R X |
| 4,907,496 | 3/1990 | Neal | 92/130 R X |

OTHER PUBLICATIONS

AMP drawing No. D 69060 entitled "Crimping Head Assembly".

*Primary Examiner*—Edward K. Look
*Assistant Examiner*—John Ryznic

[57] ABSTRACT

Hydraulic actuator comprises a piston-cylinder which has a fail-safe feature in the form of a lost motion coupling between the cylinder head and portions of the cylinder. The coupling comprises a constraining rod which is secured to the cylinder at the opposite end thereof from the cylinder head. The constraining rod extends into a bore in the piston rod and has a shoulder which is opposed to a shoulder on the piston. The amplitude of the lost motion is such that the coupling does not interfere with normal operation of the actuator but is effective in the event of failure of the cylinder or cylinder head. The lost motion coupling would prevent movement of any parts broken away by the fracture any significant distance from the remaining parts of the cylinder. An energy absorbing means is provided in the lost motion coupling. A second lost motion coupling is provided between the end of the cylinder and the external surface of the cylinder head.

17 Claims, 3 Drawing Sheets

HYDRAULIC ACTUATOR HAVING FAIL-SAFE FEATURE WITH ENERGY ABSORBING SLEEVE

FIELD OF THE INVENTION

This invention relates to hydraulic actuators of the type used in compressing tools, for example, crimping tools. The invention is particularly concerned with fail-safe features for such actuators.

BACKGROUND OF THE INVENTION

A commonly used type of compressing tool comprises a hydraulic piston-cylinder and a tool head secured to the cylinder head. The article being worked upon, for example, a terminal being crimped, is compressed between movable and fixed dies, the movable die being mounted on the end of a ram which in turn is secured to the piston rod.

Compressing tools of the type described above frequently are highly stressed when used and must therefore be extremely robust and carefully constructed to avoid the possibility of failure of any of the parts, particularly the parts of the hydraulic actuator. It is virtually impossible for a failure to occur in a properly designed and properly maintained compressing tool used in accordance with the manufacturer's recommendation. However, it is always possible that through misuse or lack of maintenance, a failure will occur in the hydraulic system and particularly in the cylinder or cylinder head. The hydraulic pressures in such tools are quite high and return springs are commonly used which are interposed between the cylinder head and the piston to return the piston to its starting position after completion of a crimping or other compressing operation. If a failure should occur at the time in the compressing cycle when the hydraulic pressure is at its maximum level and the spring is compressed to its maximum extent, it is possible that parts of the tool will be propelled outwardly by the compressed return spring since the hydraulic pressure is being maintained during this interval on the piston.

The present invention is directed to the achievement of a fail-safe feature which will prevent any significant movement of any of the parts of the tool in the event of a fracture in the cylinder head or in the cylinder wall. The invention is further directed to the achievement of a fail-safe feature which can be incorporated into the tool without increasing the dimensions of the tool and without in any way interfering with the normal operation of the tool.

THE INVENTION

A preferred embodiment of the invention comprises a terminal crimping tool having a tool head and a hydraulic piston-cylinder actuator. The actuator comprises a cylinder, a piston within the cylinder, and a piston rod extending from the piston through the cylinder head. A movable crimping die is secured to the end of the piston rod and a fixed crimping die is mounted in the tool head. A return spring is interposed between the low pressure side of the piston and the opposed surface of the cylinder head so that after the piston rod and the piston have moved to the end of their power stroke and the hydraulic pressure is relieved, the return spring will move the piston and piston rod back to their initial positions. Fail-safe means are provided to prevent any substantial movement of any of the parts of the tool outwardly in the event of a structural failure in the cylinder or cylinder head. The fail-safe means comprises first and second lost motion couplings between the cylinder and the cylinder head and portions of the cylinder adjacent to the cylinder head. The first lost motion coupling comprises a constraining rod which is secured to the cylinder at a location adjacent to the fluid inlet and which extends axially into a bore in the piston and the piston rod. The end of the constraining rod has a shoulder which is directed towards a complementary shoulder in the bore. The second lost motion coupling comprises a flange on the end of the piston rod which extends beyond the external surface of the cylinder head. These lost motion couplings do not interfere with the normal operation of the tool since the amount of lost motion in each of the couplings exceeds the stroke of the piston and piston rod. If, however, a fracture or other failure should occur in any parts of the tool are propelled outwardly by the compressed return spring, the lost motion of the two couplings will be exceeded and the outward movement of the parts will thereby be constrained. Advantageously, an energy absorbing means is provided in the first lost motion coupling in the form of a thin walled sleeve which surrounds the constraining rod. This sleeve would be crushed in the event of a failure and a resulting movement of any of the tool parts to the extent that the lost motion in the first coupling would be exceeded.

THE DRAWING FIGURES

THE DISCLOSED EMBODIMENT

Figure 1:
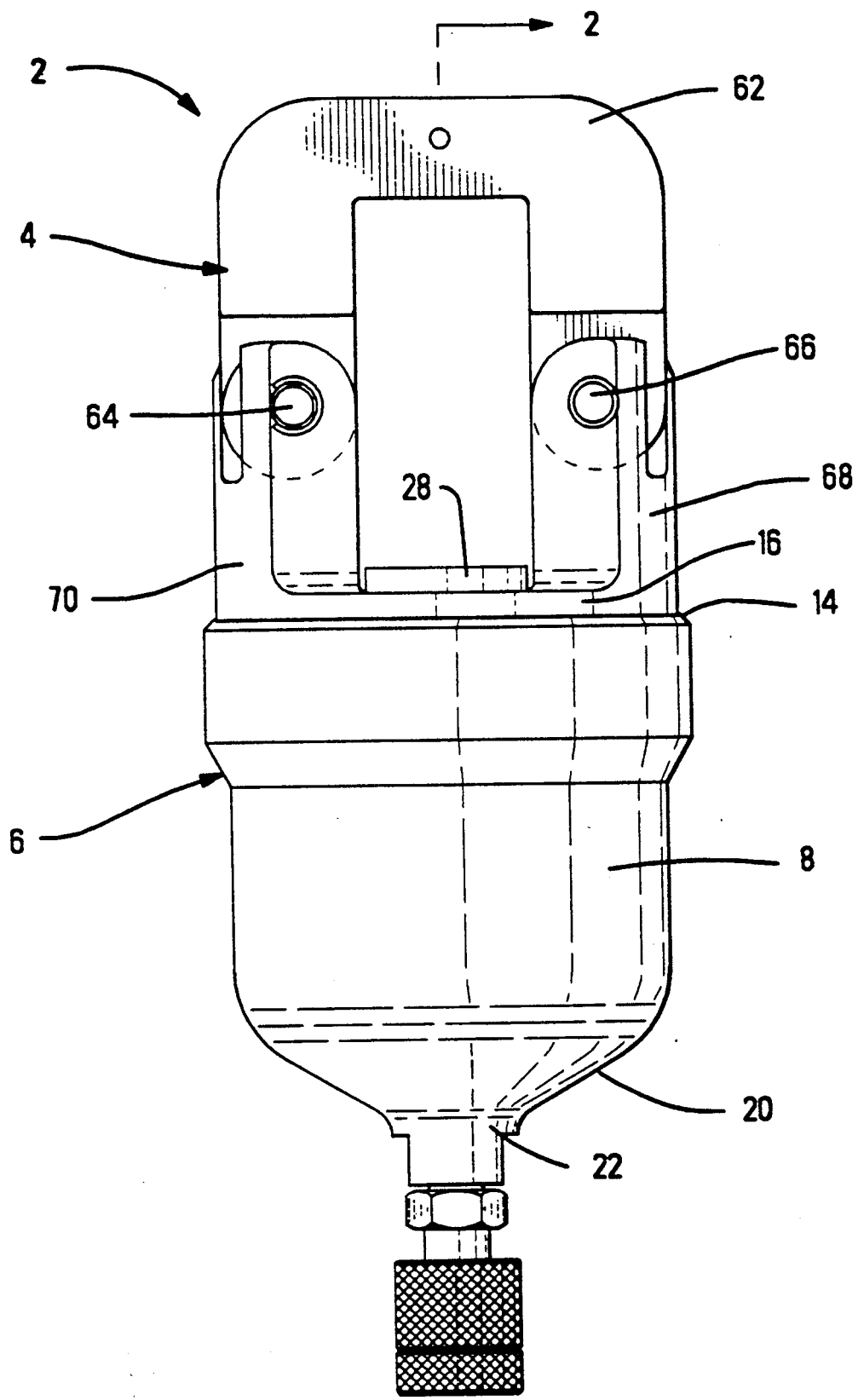
FIG. 1 is a side view of a crimping tool in accordance with the invention.

A tool assembly 2 in accordance with the invention comprises a head portion 4 and an actuator 6. The actuator comprises a cylinder 8, a piston 10, and a piston rod 12 which is integral with the cylinder and which extends upwardly through a first end 14 of the cylinder. The first end 14 has a cylinder head 16 secured therein by threads 18 and by additional threaded fasteners as shown. The second end 20 of the cylinder has a fluid inlet 22 on the axis of the cylinder which can be coupled to or can receive a coupling for a fluid hose as shown.

The upper end 26 of the piston rod is counter-bored as shown at 24 and an adapter or tool holder 28 is contained and secured in this counter-bore by any suitable means such as dowel pins (not shown). The adapter has a flange portion 27 which extends over and is opposed to the upwardly facing surface 29 of the cylinder head 16.

A movable crimping die 30 is secured to the adapter 28 by a set screw and is cooperable with a fixed crimping die mounted in the tool head. For reasons explained below, sealing rings or O-rings 32 are provided in a circumferential groove in the adapter. Also, an axial channel or groove is provided as shown at 34 and receives an aligning pin 36 which extends radially into the groove and is maintained in its position by a suitable set screw and spring.

A return spring 38 is provided between the underside of the cylinder head 16 and the upwardly facing surface 42 of the piston. The upper end of this spring is received in a recess 40 in the underside of the cylinder head.

An axial bore 44 extends entirely through the piston and the piston rod and a constraining rod 46 is received in this bore. The constraining rod is secured at its lower end 48 to the inlet 22 and is hollow so that the hydraulic fluid will flow into the constraining rod and through holes 50 into the high pressure side of the cylinder. Rod 46 has an enlarged upper end 52 which is slidably received in the bore 44 and which has a downwardly facing circumferential shoulder 56. Shoulder 56 is opposed to an upwardly facing shoulder 54 which is provided by a lip portion which extends inwardly towards the constraining rod. An energy absorbing means 58 is provided between the shoulders 54, 56 in the form of a sleeve which is slidably mounted on the constraining rod. This sleeve should be of a material, such as a soft aluminum alloy, which will readily be crushed and compressed in the event of a failure of the tool and which, in being compressed, will absorb a substantial amount of kinetic energy.

The fixed die 60 is secured in a U-shaped yoke 62 the arms of which are secured by a pivot pin 64 and a locking pin 66 to fixed arms and 70 which extend from the upper surface of the cylinder head.

Figure 2:
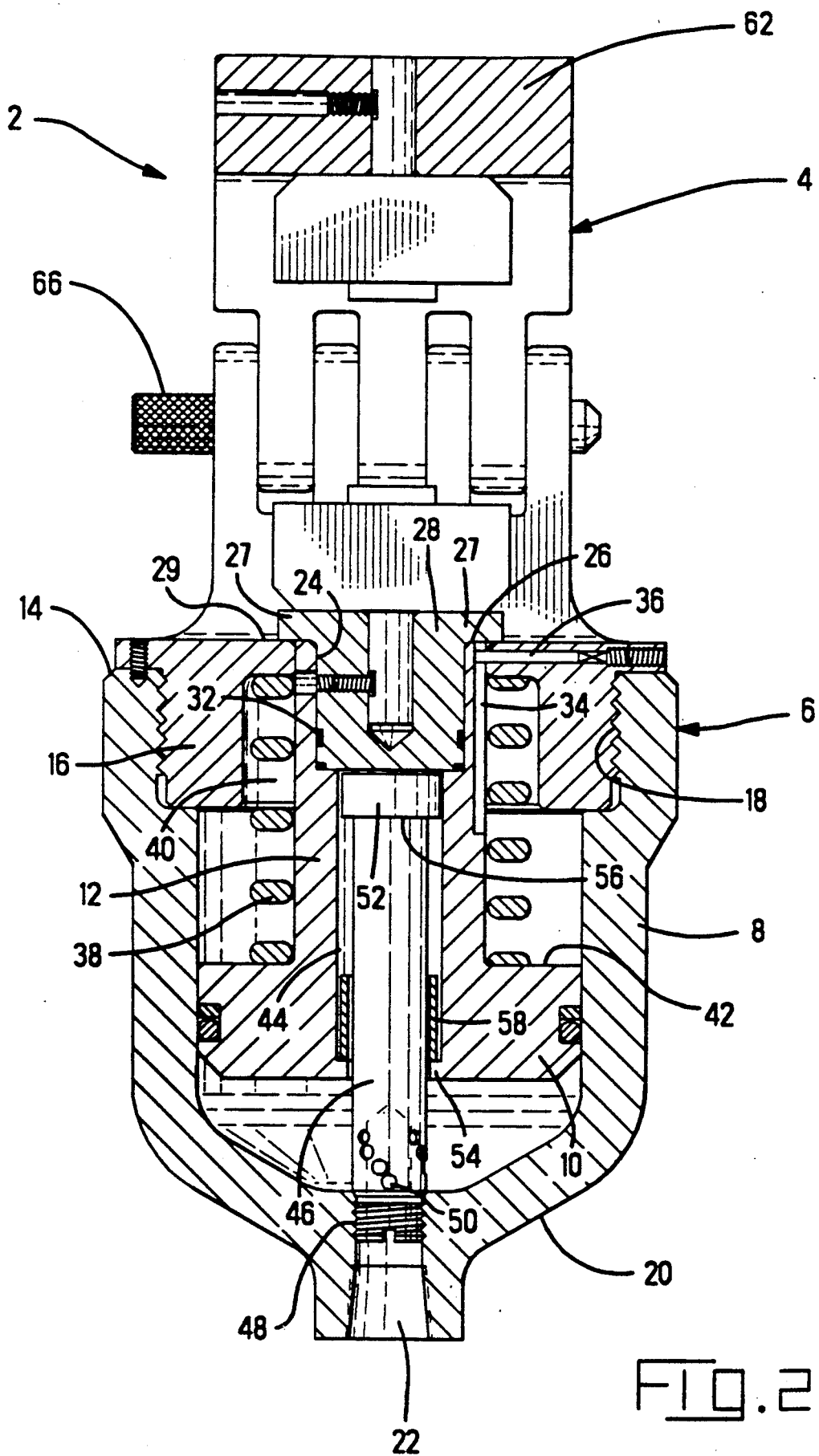
FIG. 2 is a sectional view looking in the direction of the arrows 2—2 of FIG. 1, this view showing the positions of the parts prior to the commencement of a crimping operation.

In normal use, an electrical terminal and wire are placed between the fixed and movable crimping dies and hydraulic fluid is admitted through the inlet 22 and the openings 50 to the interior of the cylinder. The piston is thus moved upwardly to the position of FIG. 3 which shows the parts substantially at the end of a crimping operation. The flange of the adapter 28 is spaced from the upper surface of the cylinder head and the energy absorbing sleeve 58 is adjacent to the downwardly facing shoulder 56 of the constraining rod 46. When the crimping operation is completed, the pressure of the hydraulic fluid is relieved by a remote valve and the compressed spring 38 returns the piston 10 to the position of FIG. 2 and forces the hydraulic fluid from the high pressure side of the cylinder.

Figure 3:
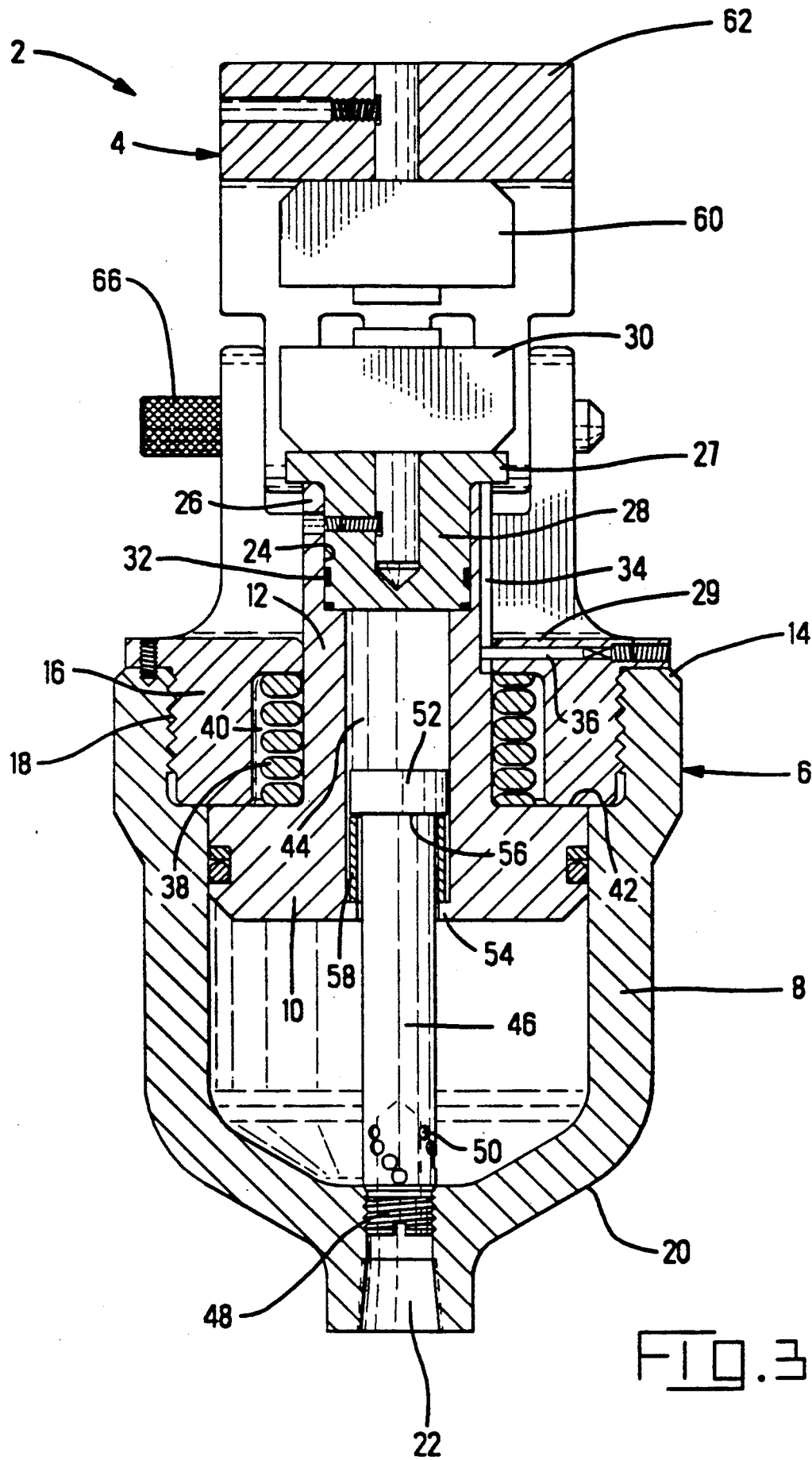
FIG. 3 is a view similar to FIG. 2 but showing the positions of the parts at or near the end of a crimping operation and showing the compression spring in its compressed condition.

If a structural failure were to occur, it would occur with the parts in the position of FIG. 3; that is, with the spring 38 in its maximum state of compression and with the stresses in the parts at the highest level achieved during the operating cycle. Such failure would usually take the form of a separation of the cylinder head from the cylinder or a circumferential fracture in the cylinder in the vicinity of the cylinder head. In either event, the compressed spring 38 will move the cylinder head, and any parts of the cylinder secured to the cylinder head, upwardly so that the surface 29 of the cylinder head 16 will move against the flange 27 of the tool holder. The momentum of the upwardly moving cylinder head will then move the piston rod and piston upwardly and the sleeve 58 will be compressed between the shoulders 54, 56. The compression of the sleeve will absorb the final remnants of kinetic energy in the cylinder head and the parts will come to rest.

It will be apparent from the foregoing description that the arrangement of the enlarged head 52 on the constraining rod and the lip 54 on the piston 10 constitute a lost motion coupling between the second end 20 of the cylinder and the piston and piston rod. Moreover, this lost motion coupling contains the energy absorbing sleeve 58 which is cause to absorb the energy of the failure when the coupling becomes effective. The secondary lost motion coupling is provided by virtue of the flange of the adapter and the opposed surface of the cylinder head. Neither of these lost motion couplings require any significant changes in the overall dimensions of the tool and add very little to the expense of manufacturing the tool. The O-rings 32 are required for the reason that the high pressure fluid is not prevented from entering the counter-bore 44 from the high pressure side of the piston. The fluid would thus flow beyond the enlarged head 52 of the constraining rod and the O-rings prevent fluid from flowing beyond the circumferential groove in which these rings are contained.

It will be apparent from the foregoing description that an extremely simple fail-safe mechanism has been provided for a commonly known type of hydraulic actuator which will prevent any significant movement of any parts of the tool in the event of a failure.

We claim:

1. A hydraulic piston-cylinder assembly comprising a cylinder having first and second ends, a cylinder head at the first end, a piston in the cylinder and a piston rod secured to the piston and extending through the cylinder head, the cylinder having a hydraulic fluid inlet proximate to the second end, and a return spring interposed between the cylinder head and the piston, the piston cylinder being characterized in that:

fail-safe constraining means are provided for constraining movement of any portion of the assembly under the influence of the return spring in the event of fracture and resulting separation of the portion of the assembly, the constraining means comprising coupling means extending from the cylinder head to a location proximate to the second end, the constraining means being coupled to the cylinder head and to the second end, the constraining means permitting reciprocation of the piston and the piston rod and preventing significant movement of any portion of the assembly other than reciprocation of the piston and the piston rod.

2. A piston-cylinder assembly as set forth in claim 1 characterized in that the constraining means is coupled to the second end of the cylinder by a rigid coupling and coupled to the cylinder head by lost motion coupling means.

3. A piston-cylinder assembly as set forth in claim 2 characterized in that the constraining means comprises a constraining rod.

4. A piston-cylinder assembly as set forth in claim 1 characterized in that the constraining means comprises a rigid constraining rod which extends along, and surrounds, the axis of the cylinder, the constraining rod being secured to the second end of the cylinder by a rigid coupling, the piston and the piston rod having an axially extending opening, the constraining rod extending into the opening.

5. A piston-cylinder assembly as set forth in claim 2 characterized in that the constraining means comprises a rigid rod which extends parallel to the axis of the cylinder and parallel to the piston rod, the lost motion coupling means comprising first and second lost motion couplings, the first lost motion coupling serving to couple the constraining rod to the piston and piston rod, the second lost motion coupling serving to connect the piston and piston rod to the cylinder head, the lost motion couplings permitting reciprocation of the piston and piston rod and otherwise preventing significant movement of any portion of the assembly.

6. A piston-cylinder assembly as set forth in claim 5 characterized in that the piston and piston rod have an axially extending opening, the constraining rod extends along, and surrounds, the axis of the cylinder and extends into the opening, the first lost motion coupling comprises opposed shoulders on the constraining rod and on the piston.

7. A piston cylinder assembly as set forth in claim 5 characterized in that the second lost motion coupling comprises surface portions of the piston rod which are opposed to, and which overlap, external surface portions of the cylinder head.

8. A piston cylinder assembly as set forth in claim 5 characterized in that the piston and piston rod have an axially extending opening, the constraining rod extends along, and surrounds the axis of the piston-cylinder and extends into the opening, the first lost motion coupling comprises opposed shoulders on the constraining rod and on the piston, the second lost motion coupling comprises surface portions of the piston rod which are exposed to, and which overlap, external surface portions of the cylinder head.

9. A piston-cylinder assembly as set forth in claim 8 characterized in that energy absorbing means are provided in the first lost motion coupling for absorbing energy in the event of fracture.

10. A piston-cylinder assembly as set forth in claim 9 characterized in that the energy absorbing means comprises a compressible sleeve which surrounds the constraining rod and which is between the opposed shoulders.

11. A compressing tool assembly (2) such as a crimping tool, comprising a hydraulic piston-cylinder (6) and a tool head (4), the piston-cylinder assembly (6) comprising a cylinder (8) having first and second ends (14,20), a cylinder head (16) at the first end (14), a piston (10) in the cylinder and a piston rod (12) extending from the piston and through the cylinder head (16), the cylinder (8) having a hydraulic fluid inlet (22) proximate to the second end (20), and a return spring (38) interposed between the cylinder head (16) and the piston (10), the tool head (4) being secured to the cylinder head (16), the piston rod (12) having an end portion (26) having a movable compressing die (30) thereon, the tool head (4) having a fixed compressing die (60) thereon, the tool assembly being characterized in that:

fail-safe constraining means are provided for constraining movement of any portion of the tool assembly under the influence of the return spring (38) in the event of fracture of the cylinder (8) and resulting separation of a portion of the assembly, the constraining means comprising a constraining rod (46) which is rigidly secured to the second end (20) of the cylinder (8) and extends axially towards the cylinder head (16), the constraining rod (46) being coupled to the cylinder head (16) by lost motion coupling means which permits reciprocation of the piston and which prevents significant movement of the head and portions of the cylinder assembly under the influence of the return spring in the event of fracture of the cylinder.

12. A compressing tool assembly as set forth in claim 11 characterized in that the fluid inlet (22) is on the axis of the cylinder at the second end thereof and the constraining rod (46) surrounds the axis of the cylinder (8), the constraining rod is hollow and has openings (50) therein to permit the flow of hydraulic fluid into, and from, the interior of the cylinder.

13. A compressing tool assembly as set forth in claim 12 characterized in that the lost motion coupling means comprises first (52,54) and second (27,29) lost motion couplings, the first lost motion coupling serving to couple the constraining rod (46) to the piston and piston rod (10,12), the second lost motion coupling serving to connect the piston rod (12) to the cylinder head (16).

14. A compressing tool assembly as set forth in claim 13 characterized in that the piston and piston rod have an axially extending opening, the constraining rod extends into the opening, the first lost motion coupling comprises opposed shoulders on the constraining rod and on the piston rod which are on an end portion of the constraining rod and in the opening respectively.

15. A compressing tool assembly as set forth in claim 13 characterized in that the second lost motion coupling comprises surface portions of the piston rod which are opposed to, and which overlap, external surface portions of the cylinder head.

16. A compressing tool assembly as set forth in claim characterized in that the piston and piston rod have an axially extending opening, the constraining rod extends into the opening, the first lost motion coupling comprises opposed shoulders on the constraining rod and on the piston, the second lost motion coupling comprises surface portions of the piston rod which are opposed to, and which overlap, external surface portions of the cylinder head.

17. A compressing tool assembly as set forth in claim 16 characterized in that enery absorbing means are provided in the first lost motion coupling for absorbing energy in the event of fracture, the energy absorbing means comprising a compressible sleeve which surrounds the constraining rod and which is between the opposed shoulders.

* * * * *

UNITED STATES PATENT OFFICE
CERTIFICATE OF CORRECTION

Patent No. 5,036,752  Dated August 6, 1991

Inventor(s): George E. Hoover and Douglas J. Leiby

It is certified that error appears in the above-identified patent and that said Letters Patent is hereby corrected as shown below:

In claim 8, column 5, line 22, delete the word "exposed" and replace with --opposed--.

In claim 16, column 6, line 38, after "claim" insert --13--.

In claim 17, column 6, line 48, delete "enery" and replace with --energy--.

Signed and Sealed this

First Day of December, 1992

*Attest:*

DOUGLAS B. COMER

*Attesting Officer*   *Acting Commissioner of Patents and Trademarks*